United States Patent
Li et al.

(10) Patent No.: US 10,528,562 B2
(45) Date of Patent: ***Jan. 7, 2020

(54) ADAPTIVE INTERSECT QUERY PROCESSING

(71) Applicant: International Business Machines Corporation, Armonk, NY (US)

(72) Inventors: Shuo Li, Beijing (CN); Heng Liu, Beijing (CN); Ke Wei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 485 days.

This patent is subject to a terminal disclaimer.

(21) Appl. No.: 15/262,538

(22) Filed: Sep. 12, 2016

(65) Prior Publication Data
US 2017/0060949 A1 Mar. 2, 2017

Related U.S. Application Data

(63) Continuation of application No. 14/837,019, filed on Aug. 27, 2015, now Pat. No. 9,892,161.

(51) Int. Cl.
*G06F 17/30* (2006.01)
*G06F 16/2453* (2019.01)
(Continued)

(52) U.S. Cl.
CPC ...... *G06F 16/24542* (2019.01); *G06F 16/248* (2019.01); *G06F 16/24545* (2019.01); *G06F 16/24553* (2019.01)

(58) Field of Classification Search
CPC ......... G06F 16/24542; G06F 16/24545; G06F 16/24553; G06F 16/248
See application file for complete search history.

(56) References Cited

U.S. PATENT DOCUMENTS 5,960,428 A 9/1999 Lindsay
6,295,539 B1 9/2001 Isip, Jr.
(Continued)

OTHER PUBLICATIONS

IBM, "List of IBM Patents or Patent Applications Treated as Related", Appendix P, dated Sep. 13, 2016, 2 pages.
(Continued)

*Primary Examiner* — Syed H Hasan
(74) *Attorney, Agent, or Firm* — Aaron N. Pontikos

(57) ABSTRACT

A computer-implemented method includes identifying a query, including one or more predicates and one or more branches, wherein one or more branches includes one or more legs. The computer-implemented method further includes, for each branch, in parallel: determining a risk, determining a return row threshold, estimating a number of return rows; terminating access if the return rows exceed the threshold. The computer-implemented method further includes, for each leg, in parallel: determining a leg return row threshold; accessing the leg; fetching one or more return rows into one or more leg return row pages; terminating access if the return rows exceed the threshold; intersecting one or more leg return row pages into one or more intersected leg return row pages; and applying the one or more predicates to the one or more intersected leg return row pages. The method may be embodied in a corresponding computer system or computer program product.

7 Claims, 5 Drawing Sheets

(51) Int. Cl.
*G06F 16/248* (2019.01)
*G06F 16/2455* (2019.01)

(56) References Cited

U.S. PATENT DOCUMENTS

| | | | |
|---|---|---|---|
| 6,427,143 | B1 | 7/2002 | Isip, Jr. |
| 7,472,130 | B2 * | 12/2008 | Stern ................ G06F 16/90335 |
| 7,617,189 | B2 | 11/2009 | Ghosh et al. |
| 7,680,821 | B2 | 3/2010 | Finlay |
| 8,126,870 | B2 | 2/2012 | Chowdhuri et al. |
| 8,626,790 | B2 | 1/2014 | Potdar |
| 8,676,865 | B2 | 3/2014 | Han et al. |
| 2004/0267719 | A1 | 12/2004 | Doherty |
| 2006/0155915 | A1 | 7/2006 | Pereira |
| 2009/0292714 | A1 | 11/2009 | Han |
| 2010/0121839 | A1 * | 5/2010 | Meyer ................ G06F 16/972 707/720 |
| 2011/0029508 | A1 | 2/2011 | Al-Omari |
| 2012/0047158 | A1 | 2/2012 | Lee |
| 2012/0158698 | A1 | 6/2012 | Bestgen |
| 2013/0173569 | A1 * | 7/2013 | Pearcy ................ H04L 12/1813 707/706 |
| 2014/0280283 | A1 | 9/2014 | Li |
| 2015/0254303 | A1 | 9/2015 | Saadat |
| 2015/0379010 | A1 | 12/2015 | Allen |
| 2016/0182520 | A1 | 6/2016 | Liu |
| 2018/0089259 | A1 * | 3/2018 | James ................ G06F 16/2282 |

OTHER PUBLICATIONS

Li et al., "Adaptive Intersect Query Processing", U.S. Appl. No. 14/837,019, filed Aug. 27, 2015, 26 pages.

IBM Appendix P., "List IBM Patents or Patent Applications to be Treated as Related", Dated Nov. 10, 2017, 2 pages.

Li et al., "Adaptive Intersect Query Processing", U.S. Appl. No. 15/809,406, filed Nov. 10, 2017, pp. 1-21.

* cited by examiner

ADAPTIVE INTERSECT QUERY PROCESSING

BACKGROUND

The present invention relates generally to query processing in relational databases and in particular to enhanced index access for intersect query processing.

Row identification (RID) list intersection is a common approach in query processing in relational database management systems (RDMS) such as IBM® DB2®, Oracle® Database, and Microsoft® SQL Server®. Currently, one method of RID list intersection is index anding. To apply a conjunction of predicates on a data table, a query processor performs index lookups to form one or more sorted RID lists (or bitmap) of the rows matching each predicate, merges all of the RID lists of matching RIDs for each predicate, intersects the RID lists via an AND-tree, and fetches the corresponding rows to apply any residual predicates. However, RID list intersection can become costly when the RID lists are large.

SUMMARY

A computer-implemented method includes identifying a query to a database management system. The query includes one or more predicates and one or more branches. Each of the one or more branches includes one or more legs. The computer-implemented method further includes, for each branch of the one or more branches, in parallel: determining a risk ratio for the branch, based on a branch risk ratio heuristic; determining a return row threshold for the branch, based on a branch return row threshold heuristic; estimating a number of return rows for the branch; and responsive to the number of return rows being above said return row threshold, terminating access to the branch. The computer-implemented method further includes, for each leg of the one or more legs, in parallel: determining a leg return row threshold for the leg, based on a leg return row threshold heuristic; accessing the leg; fetching one or more leg return rows from the leg into one or more leg return row lists; responsive to the number of leg return rows being above the leg return row threshold, terminating access to the leg; responsive to the number of leg return rows being below the leg return row threshold, intersecting one or more leg return row lists into one or more intersected leg return row lists; and applying the one or more predicates to the one or more intersected leg return row lists. A corresponding computer system and computer program product are also disclosed.

DETAILED DESCRIPTION

Figure 1:
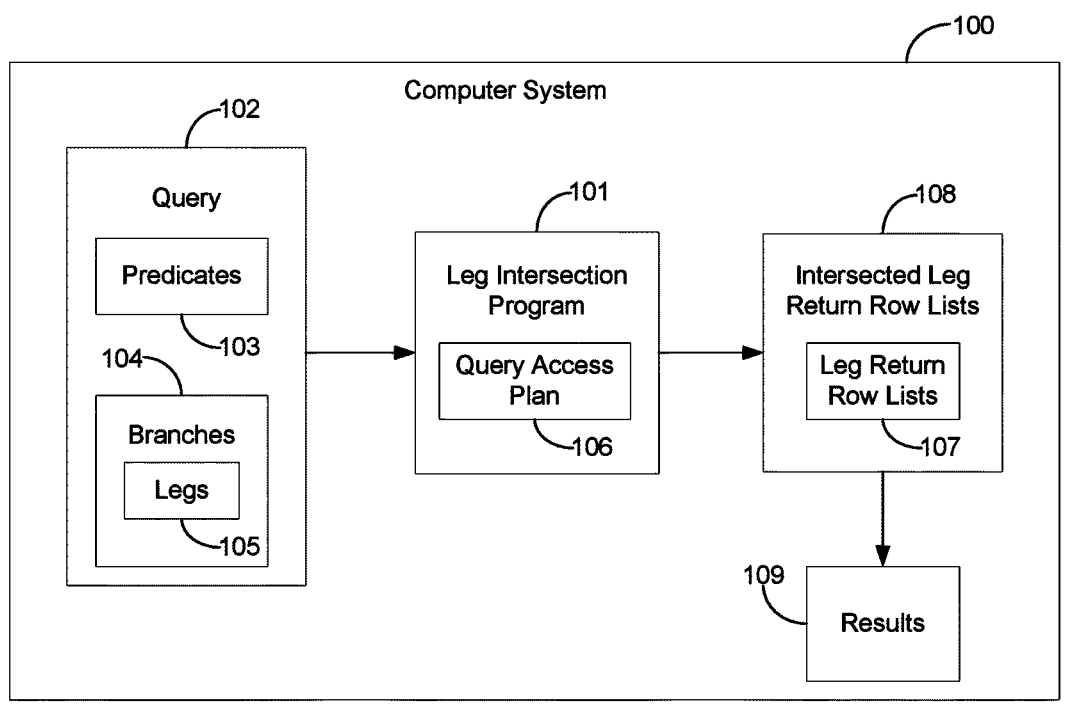
FIG. 1 is a block diagram of one embodiment of a computer system environment suitable for operation in accordance with at least one embodiment of the invention.

Referring now to various embodiments of the invention in more detail, FIG. 1 is a block diagram of one embodiment of a computer system environment suitable for operation in accordance with at least one embodiment of the invention. Within a computer system 100, a leg intersection program 101 may identify a query 102 to a database management system including one or more predicates 103 and one or more branches 104. Each of the one or more branches 104 may further include one or more legs 105. Generally, a leg includes one or more leg return row lists 107, wherein a leg return row list 107 is a row identification (RID) list. A RID list further includes one or more leg return rows, wherein a leg return row is the location of a row of data on one or more data tables. Upon identifying a query 102, the leg intersection program 101 may create a query access plan 106 to access, in parallel, one or more branches 104 and one or more legs 105.

Generally, parallel query processing may be implemented through a number of different applications. For example, the leg intersection program 101 may implement the use of query input/output (I/O) parallelism, which enables concurrent I/O streams to be initiated for a single query. Query I/O parallelism can significantly enhance the performance of I/O bound queries by breaking the data access for the query into concurrent I/O streams executed in parallel. Thus, the overall elapsed time for the query may be reduced. In another example, the leg intersection program 101 may implement the use of query computer processor (CP) parallelism, which enables multitasking of I/O streams and computer processing units (CPU) within a query. With query CP parallelism, a large query is decomposed into multiple smaller queries that can be executed concurrently with one another on multiple processors. Thus, query CP parallelism may also reduce the elapsed time for a query.

Within the leg intersection program 101, for each branch 104, in parallel, the leg intersection program 101 may determine a risk ratio for each branch 104, based on a branch risk ratio heuristic. The leg intersection program 101 may further determine a return row threshold for each branch 104, based on a return row threshold heuristic. The leg intersection program 101 may further estimate a number of return rows for each branch 104. The leg intersection program 101 may further terminate access to one or more branches 104 if one or more branches 104 are estimated to return a number of return rows above the return row threshold for one or more branches 104.

Additionally, according to the query access plan 106, for each leg 105, in parallel, the leg intersection program 101 may determine a leg return row threshold for one or more legs 105, based on a leg return row threshold heuristic. The leg intersection program 101 may further access one or more legs 105. The leg intersection program 101 may further fetch one or more leg return rows from one or more legs 105 into one or more leg return row lists 107. The leg intersection program 101 may further terminate access to one or more legs 105 if one or more legs 105 return a number of leg return rows above the leg return row threshold for one or more legs 105. The leg intersection program 101 may further intersect one or more leg return row lists 107 into one or more intersected leg return row lists 108 if the number of leg return rows for one or more legs 105 is below the leg return row threshold for one or more legs 105.

Additionally, the leg intersection program 101 may apply one or more predicates 103 to one or more intersected leg return row lists 108 to form one or more results 109. The one or more results 109 include those portions of the legs 105 that match one or more predicates 103 included within a query 102. For example, the one or more results 109 may be data presented as alphanumeric or text, numbers, or dates and times.

Figure 2:
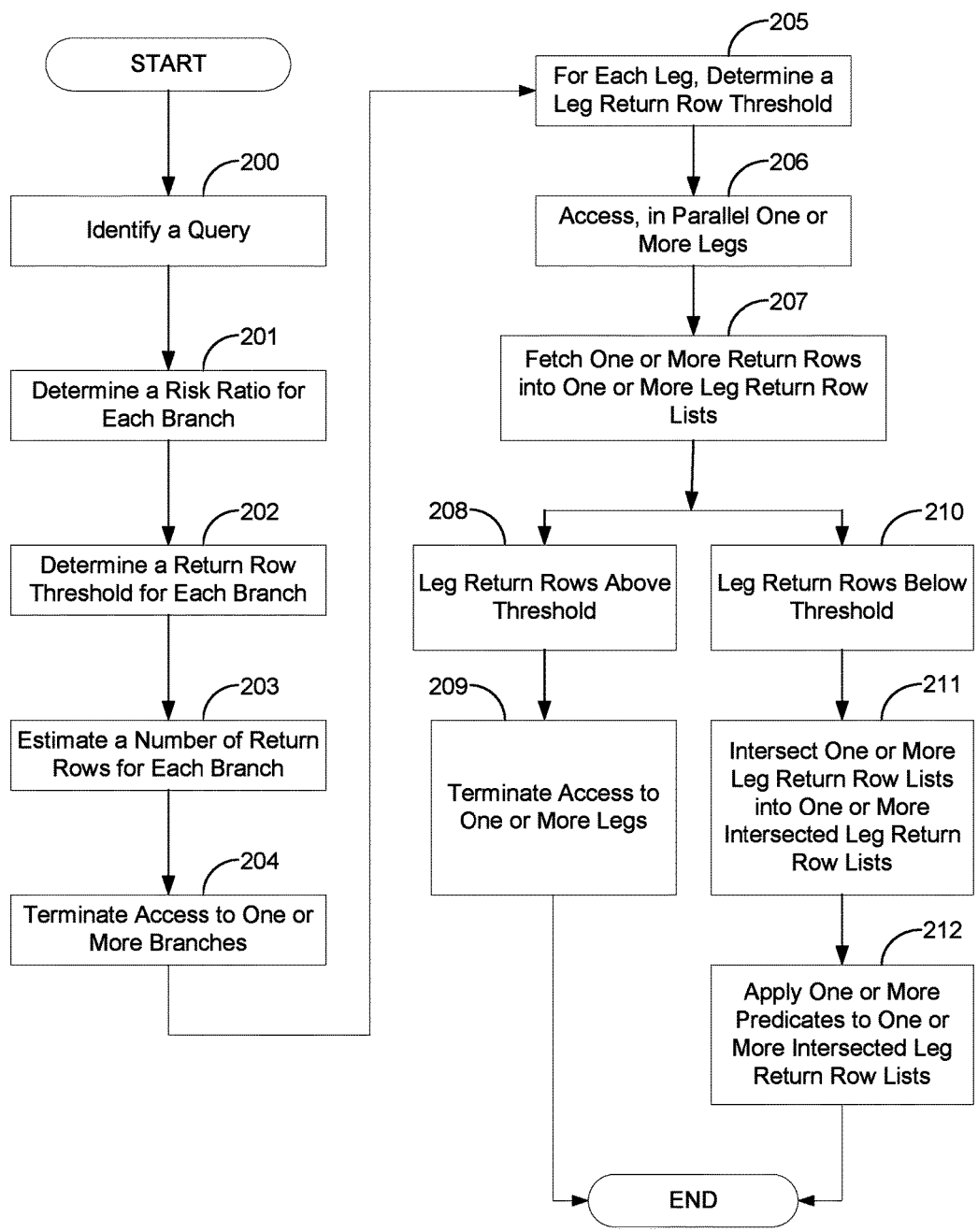
FIG. 2 is a flow chart diagram depicting the leg intersection program in accordance with at least one embodiment of the invention.

Referring now to the flow chart diagram of FIG. 2, FIG. 2 depicts at least one embodiment of the leg intersection program 101. According to the depicted embodiment, at step 200, the leg intersection program 101 may identify a query 102. The query 102 may include one or more predicates 103, one or more branches 104, and one or more legs 105.

Upon identifying a query 102, the leg intersection program 101 may create a query access plan 106 that is the most cost-effective way to retrieve one or more results 109. The leg intersection program 101 may formulate a query access plan 106 that reduces overall cost in executing the query 102. The performance of RID list intersection via index anding is sensitive to the order in which RID lists are intersected together. Thus, if the leg intersection program 101 chooses a wrong order, the resulting query access plan 106 can run orders of magnitude slower than expected.

Generally, the leg intersection program 101 may evaluate and weigh factors such as computer processing unit (CPU) cost, input/output (I/O) cost, database statistics, and the structured query language (SQL) statement itself. As the leg intersection program 101 calculates the previously mentioned costs, it may further determine the costs involved in applying predicates, traversing pages (index and table space) and sorting.

At step 201, for each branch 104, in parallel, the leg intersection program 101 may determine a risk ratio for each branch 104, based on a branch risk ratio heuristic. Generally, the risk ratio defined for each branch 104 may be dependent on the risk of one or more predicates 103. More specifically, the risk ratio determined by the leg intersection program 101 for each branch 104 may be dependent on the estimated cost of physically retrieving and writing data. The leg intersection program 101 may estimate the cost of the input/output (I/O) by using a series of formulas based on certain data, such as database statistics, the size of any buffer pools, and the cost of work files used, such as sorting and intermediate results. The branch risk ratio heuristic may be accomplished by any known search algorithm.

The previously mentioned data may result in a filter factor, which is a number between 0 and 1 that is relative to the I/O cost of the query. The leg intersection program 101 may calculate the filter factor for one or more predicates 103 of a query 102 based on the number of rows that will be filtered out by the predicates 103. For example, for SQL queries that involve uniform data distribution, the leg intersection program 101 may access an index in order to retrieve a default filter factor for one or more branches 104. In another example, for SQL queries that involve scattered data distribution, the leg intersection program 101 may define the risk ratio for one or more branches 104 as a maximum frequency minus a filter factor. More specifically, the leg intersection program 101 may define the risk ratio for one or more branches 104 as a maximum frequency minus (1 divided by a cardinality), where maximum frequency is defined as a value that appears the greatest amount of times within a data table and cardinality is the total number of different possible values within a data table.

At step 202, for each branch 104, in parallel, the leg intersection program 101 may determine a return row threshold for each branch 104, based on a branch return row threshold heuristic. The return row threshold may be dependent on one or more legs 105 within one or more branches 104. The branch return row threshold heuristic may be accomplished by any known search algorithm. For example, the branch return row threshold heuristic executed by the leg intersection program 101 to determine a return row threshold for each branch 104 may include taking a product of an adjustment ratio, a cardinality, and a quantity, where the quantity may be one minus a risk ratio.

At step 203, for each branch 104, in parallel, the leg intersection program 101 may estimate a number of return rows for each branch 104. The leg intersection program 101 may estimate a number of return rows for one or more branches 104 depending on the risk ratio of one or more branches 104. At step 204, the leg intersection program 101 may terminate access to one or more branches 104 if one or more branches 104 are estimated to return a number of return rows above the return row threshold for one or more branches 104. Upon terminating access to one or more branches 104, the leg intersection program 101 may revert one or more branches 104 back to a table page scan.

At step 205, for each leg 105, in parallel, the leg intersection program 101 may determine a leg return row threshold, based on a leg return row threshold heuristic. The leg return row threshold heuristic may be accomplished by any known search algorithm. The return leg row threshold may be dependent on one or more legs 105 within one or more branches 104.

The leg intersection program 101 may calculate the leg return row threshold for one or more predicates 103 of a query based on the number of leg return rows that will be returned. For example, for SQL queries that involve uniform data distribution, the leg intersection program 101 may access an index in order to retrieve a default leg return row threshold for one or more legs 105. In another example, for SQL queries that involve scattered data distribution, the leg intersection program 101 may execute a leg return row threshold heuristic to determine a leg return row threshold for each leg 105. More specifically, the leg return row threshold heuristic may include taking a product of an adjustment ratio, a cardinality, and a quantity, where the quantity may be one minus a risk ratio.

At step 206, for each leg 105, in parallel, the leg intersection program 101 may access one or more legs 105. At step 207, for each leg 105, in parallel, the leg intersection program 101 may fetch one or more leg return rows into one or more leg return row lists 107.

At steps 208 and 209, responsive to the number of leg return rows being above the leg return row threshold for one or more legs 105, the leg intersection program 101 may terminate access to one or more legs 105. Upon terminating access to one or more legs 105, the leg intersection program 101 may revert one or more legs 105 back to a table page scan.

At step 210, responsive to the number of leg return rows being below the leg return row threshold for one or more legs 105, the leg intersection program 101 may intersect one or more leg return row lists 107 into one or more intersected leg return row lists 108. Generally, an intersected leg return row list 108 is a combined RID-list for one or more legs 105. It should be appreciated that the leg intersection program 101 may intersect one or more leg return row lists 108 into one or more intersected leg return row lists 108 upon completing fetching one or more legs return rows from one or more legs 105. More specifically, the leg intersection program 101 may simultaneously intersect leg return row lists 107 from legs 105 whose access has ended and continue to fetch one or more leg return rows from legs 105 whose access is ongoing.

At steps 211 and 212, if enough leg return rows have been filtered and the intersected leg return row lists 108 are small enough, the leg intersection program 101 may terminate access to one or more legs 105 whose access remains ongoing. Alternatively, if enough leg return rows have not been filtered and the intersected leg return row lists 108 are too large, the leg intersection program 101 may continue to intersect one or more leg return row lists 107 with the one or more intersected leg return row lists 108. Once enough leg return rows have been filtered, the leg intersection program 101 may apply one or more predicates 103 directly to the intersected leg return row lists 108 to get one or more results 109.

Figure 3:
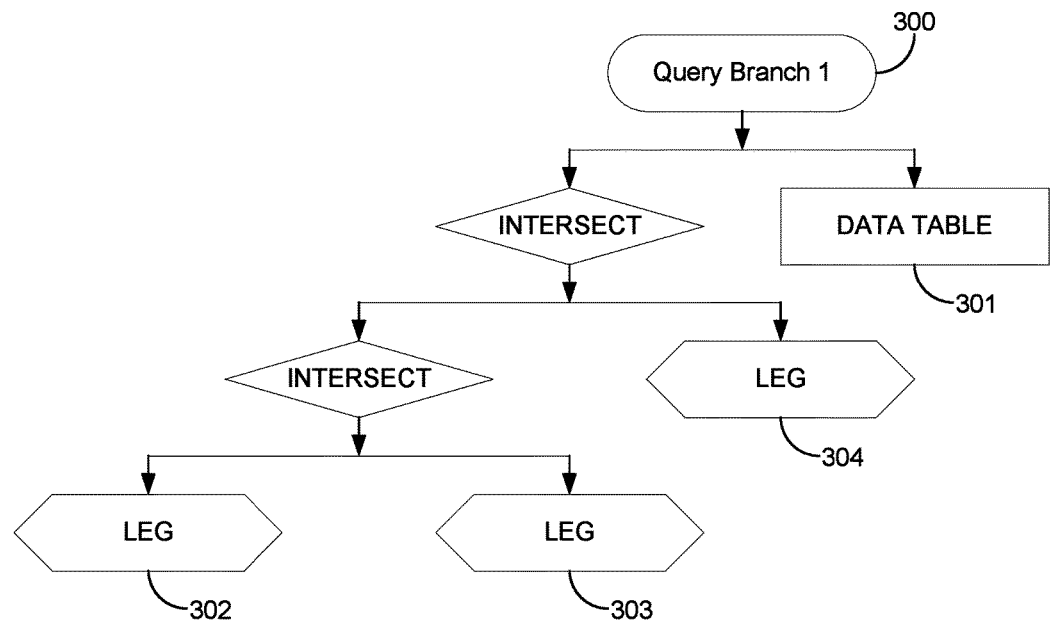
FIG. 3 is a flow chart diagram for a portion of a worked example of operational steps in accordance with at least one embodiment of the invention.

FIG. 3 displays a flow chart diagram for a portion of a worked example of operational steps in accordance with at least one embodiment of the invention. In the depicted embodiment, time ordered processing is used because the legs 105, in accordance with the exemplary query access plan 106, must be intersected in a specific order. In FIG. 3, an exemplary query access plan 106 for query 102 can be seen. A query 102 includes one or more predicates 104, one or more branches 300, one or more data tables 301, and one or more legs 302-304. The leg intersection program 101 may access the leg 302 to fetch one or more leg return rows into one or more leg return row lists 107. When access to the leg 302 has ended, the leg intersection program 101 may access the leg 303 to fetch one or more leg return rows into one or more leg return row lists 107. When access to the leg 302 and the leg 303 has ended, the leg intersection program may intersect one or more leg return row lists 107 from the leg 302 and the leg 303 into one more intersected leg return row lists 108.

Next, the leg intersection program 101 may access the leg 304 to fetch one or more leg return rows into one or more leg return row lists 107. When access to the leg 304 has ended, the leg intersection program 101 may intersect one or more leg return row lists 107 from the leg 304 with one or more intersected leg return row lists 108 from the intersection of the leg return row lists 107 from the leg 302 and the leg 303.

Finally, the leg intersection program 101 may apply one or more predicates 103 to the intersected leg return rows lists 108 from the legs 302-304 to retrieve one or more results 109 from one or more data tables 301.

Figure 4:
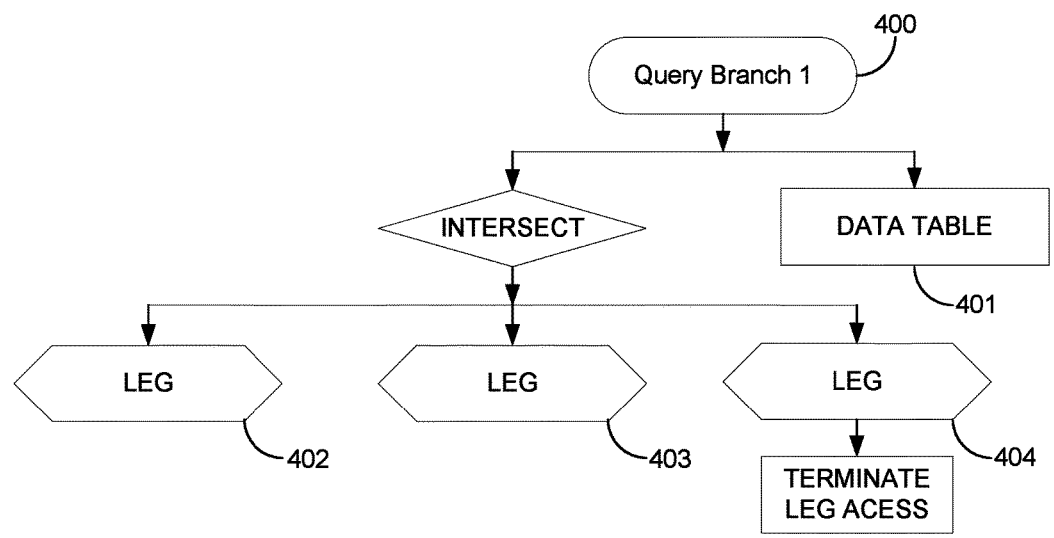
FIG. 4 is a flow chart diagram for a portion of a worked example of operational steps in accordance with at least one embodiment of the invention.
Figure 5:
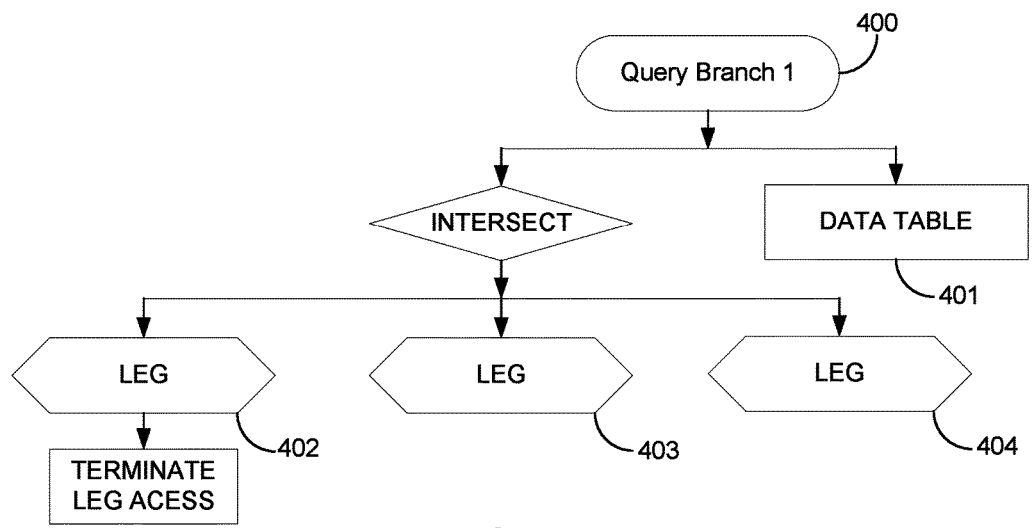
FIG. 5 is a flow chart diagram for a portion of a worked example of operational steps in accordance with at least one embodiment of the invention.
Figure 6:
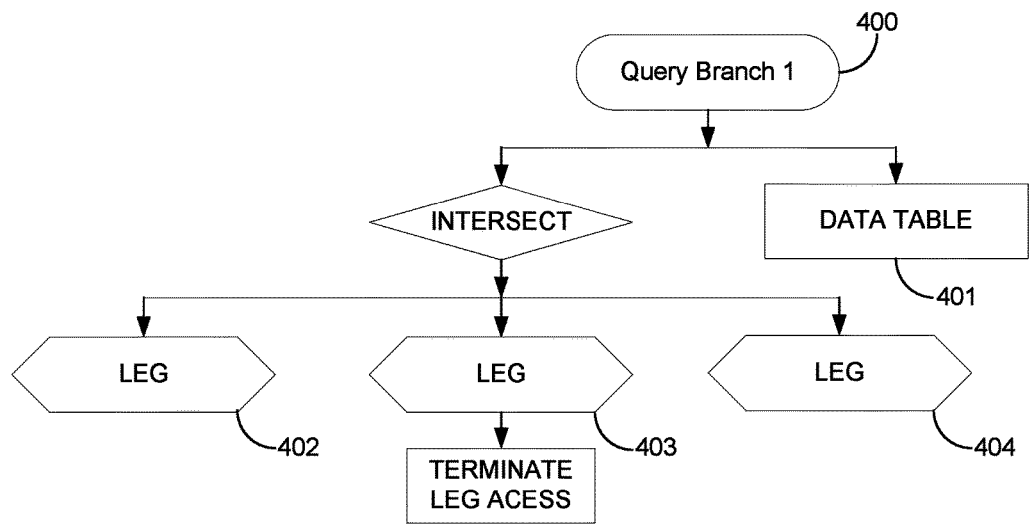
FIG. 6 is a flow chart diagram for a portion of a worked example of operational steps in accordance with at least one embodiment of the invention.

FIGS. 4, 5, and 6 display a flow chart diagram for a portion of a worked example of operational steps in accordance with at least one embodiment of the invention. In FIGS. 4, 5 and 6, an exemplary query access plan 106 for query 102 can be seen. A query 102 includes one or more predicates 103, one or more branches 400, one or more data tables 401, and one or more legs 402-404. The leg intersection program 101 may access, in parallel, one or more legs 402-404. The leg intersection program 101 may fetch, in parallel, one or more leg return rows from one or more legs 402-404 into one or more leg return row lists 107. When access to any two of the three legs 402-404 has ended, the leg intersection program 101 may intersect one or more leg return row lists 107 from two legs into one or more intersected leg return row lists 108. For example, in FIG. 4, the leg intersection program 101 may intersect the leg 402 with the leg 403. In FIG. 5, the leg intersection program 101 may intersect the leg 403 with the leg 404. In FIG. 6, the leg intersection program 101 may intersect the leg 402 with the leg 404.

Turning back to FIGS. 4-6, if enough rows have been filtered out of the resulting intersected leg return row lists 108, the leg intersection program 101 may terminate access to one or more legs 402-404 whose access remains ongoing. In FIG. 4, for example, if the leg intersection program 101 intersects the leg 402 with the leg 403 and enough rows have been filtered out of the resulting intersected leg return row lists 108, the leg intersection program may terminate access to the leg 404. In FIG. 5, for example, if the leg intersection program 101 intersects the leg 403 with the leg 404 and enough rows have been filtered out of the resulting intersected leg return row lists 108, the leg intersection program may terminate access to the leg 402. In FIG. 6, for example, if the leg intersection program 101 intersects the leg 402 with the leg 403 and enough rows have been filtered out of the resulting intersected leg return row lists 108, the leg intersection program may terminate access to the leg 403.

Turning back to FIGS. 4-6, once enough rows have been filtered out of the resulting intersected leg return row lists 108, the leg intersection program 101 may apply one or more predicates 103 to the intersected leg return row lists 108 to retrieve one or more results 109 from one or more data tables 401.

Figure 7:
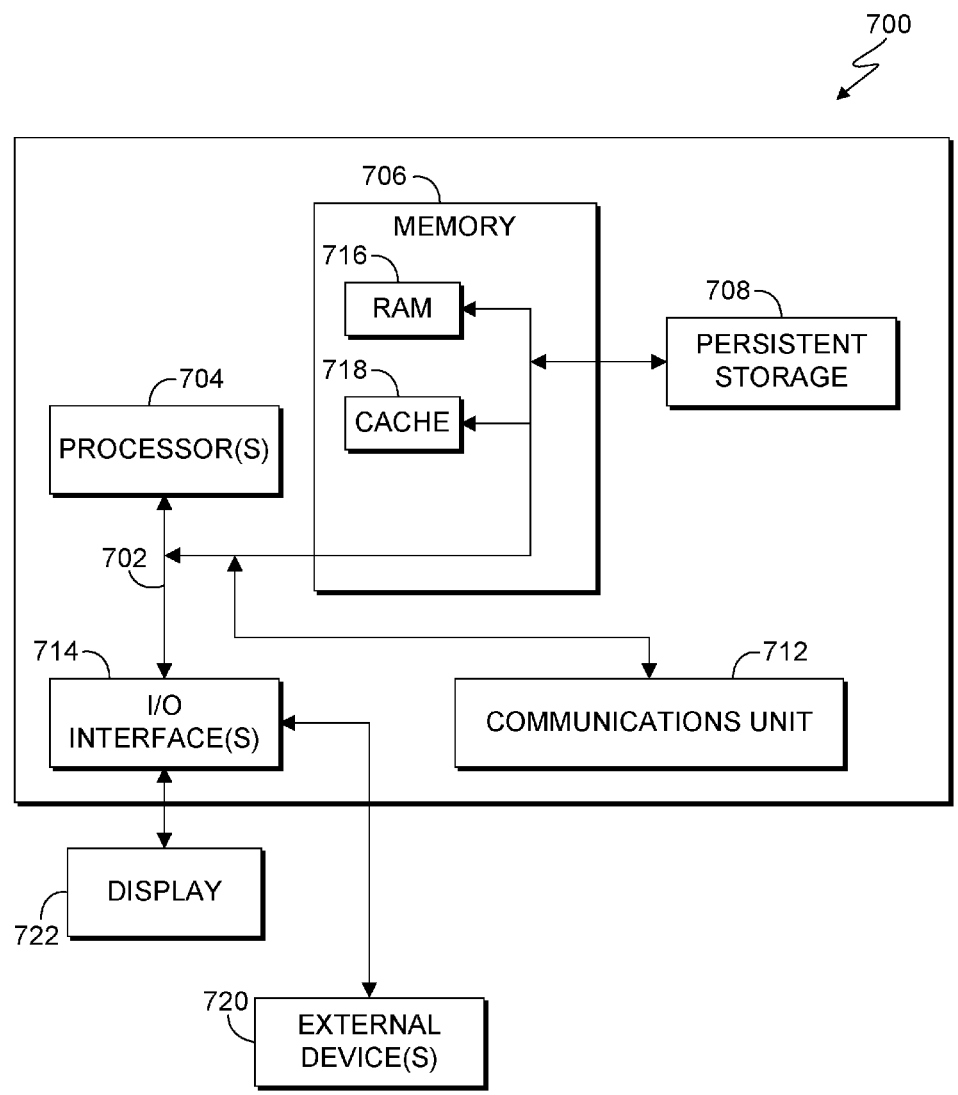
FIG. 7 is a block diagram of a computing apparatus 700 suitable for executing the leg intersection program in accordance with at least one embodiment of the invention.

FIG. 7 is a block diagram depicting components of a computer 700 suitable for executing the leg intersection program 101. FIG. 7 displays the computer 700, the one or more processor(s) 704 (including one or more computer processors), the communications fabric 702, the memory 706, the RAM 716, the cache 718, the persistent storage 708, the communications unit 712, the I/O interfaces 714, the display 722, and the external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over a communications fabric 702, which provides communications between the computer processor(s) 704, memory 706, persistent storage 708, communications unit 712, and input/output (I/O) interface(s) 714. The communications fabric 702 may be implemented with any architecture suitable for passing data or control information between the processors 704 (e.g. microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a random access memory (RAM) 716 and a cache 718. In general, the memory 706 may comprise any suitable volatile or non-volatile one or more computer readable storage media.

Program instructions for the leg intersection program 101 may be stored in the persistent storage 708, or more generally, any computer readable storage media, for execution by one or more of the respective computer processors 704 via one or more memories of the memory 706. The persistent storage 708 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 712, in these examples, provides for communications with other data processing systems or devices. In these examples, the communications unit 712 may comprise one or more network interface cards. The communications unit 712 may provide communications through the use of either or both physical and wireless communications links. In the context of some embodiments of the present invention, the source of the source of the various input data may be physically remote to the computer 700 such that the input data may be received and the output similarly transmitted via the communications unit 712.

The I/O interface(s) 714 allow for input and output of data with other devices that may operate in conjunction with the computer 700. For example, the I/O interface 714 may provide a connection to the external devices 720, which may be as a keyboard, keypad, a touch screen, or other suitable input devices. External devices 720 may also include portable computer readable storage media, for example thumb drives, portable optical or magnetic disks, and memory cards. Software and data used to practice embodiments of the present invention may be stored on such portable computer readable storage media and may be loaded onto the persistent storage 708 via the I/O interface(s) 714. The I/O interface(s) 714 may similarly connect to a display 722. The display 722 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a query to a database management system, said query comprising:
      one or more predicates;
      one or more branches;
      each of said one or more branches comprising one or more legs;
   for each branch of said one or more branches, in parallel:
      determining a risk ratio for said branch, based on a branch risk ratio heuristic;
      determining a return row threshold for said branch, based on a branch return row threshold heuristic;
      estimating a number of return rows for said branch;
      responsive to said number or return rows being above said return row threshold, terminating access said branch;
   for each leg of said one or more branches, in parallel:
      determining a leg return row threshold for said leg, based on a leg return row threshold heuristic;
      accessing said leg;
      fetching one or more leg return rows from said leg into one or more leg return row lists;
      responsive to said number of leg return rows being above said leg return row threshold, terminating access said leg;
      responsive to said number of leg return rows being below said leg return row threshold, intersecting said one or more leg return row lists into one or more intersected leg return row lists; and
      applying said one or more predicates to said one or more intersected leg return row lists to return one or more results.

2. The computer-implemented method of claim 1, wherein said risk ratio for each of said one or more branches is defined as a maximum frequency minus a filter factor.

3. The computer-implemented method of claim 1, wherein determining a return row threshold for said branch comprises taking a product of an adjustment ratio, a cardinality, and a quantity, said quantity comprising one minus a risk ratio.

4. The computer-implemented method of claim 1, wherein determining a leg return row threshold for said leg comprises taking a product of an adjustment ratio, a cardinality, and a quantity, said quantity comprising one minus a risk ratio.

5. The computer-implemented method of claim 1, wherein intersecting said one or more leg return row lists into one or more intersected leg return row lists is responsive to completing fetching of one or more leg return rows from said one or more legs.

6. The computer-implemented method of claim 1, wherein each of said one or more legs is a row identification list.

7. The computer-implemented method of claim 6, wherein said row identification list comprises one or more return rows.

* * * * *